US006218023B1

(12) United States Patent
DeNicola, Jr. et al.

(10) Patent No.: US 6,218,023 B1
(45) Date of Patent: *Apr. 17, 2001

(54) CO-EXTRUDED LAMINATE COMPRISING AT LEAST ONE PROPYLENE GRAFT COPOLYMER LAYER

(75) Inventors: Anthony J. DeNicola, Jr., Newark, DE (US); Leonardo Formaro, Larchmont, NY (US); Bakhtiar Alam Shah, New Castle, DE (US)

(73) Assignee: Montell North America, Inc., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/847,972

(22) Filed: Apr. 21, 1997

(51) Int. Cl.$^7$ .............................. B32B 27/08; B32B 3/26; B32B 5/14; B32B 9/00

(52) U.S. Cl. .................. 428/515; 428/304.4; 428/308.4; 428/318.4

(58) Field of Search .................. 428/411.1, 500, 428/515, 35.7, 36.5, 36.8, 304.4, 516, 517, 908.8, 308.4, 318.4, 319.7; 264/45.1, 45.9, 46.8, 241, 259

(56) References Cited

U.S. PATENT DOCUMENTS

| | | | |
|---|---|---|---|
| 3,692,602 | 9/1972 | Okada et al. | 156/79 |
| 4,315,050 | 2/1982 | Rourke | 428/116 |
| 4,734,312 | 3/1988 | Sugiyama | 428/157 |
| 4,957,974 | * 9/1990 | Ilenda et al. | 525/301 |
| 4,980,210 | * 12/1990 | Heyes | 428/319 |
| 5,035,933 | * 7/1991 | Ilenda et al. | 428/36.6 |
| 5,047,446 | 9/1991 | DeNicola, Jr. | 522/157 |
| 5,047,485 | 9/1991 | DeNicola, Jr. | 525/387 |
| 5,116,881 | 5/1992 | Park et al. | 521/143 |
| 5,128,410 | * 7/1992 | Ilendra et al. | 525/71 |
| 5,140,074 | 8/1992 | DeNicola, Jr. et al. | 525/263 |
| 5,180,628 | 1/1993 | Haardt et al. | 428/215 |
| 5,212,240 | 5/1993 | Ogale | 525/240 |
| 5,286,791 | 2/1994 | DeNicola, Jr. et al. | 525/71 |
| 5,300,570 | * 4/1994 | Ilenda et al. | 525/80 |
| 5,302,454 | 4/1994 | Cecchin et al. | 428/402 |
| 5,324,753 | 6/1994 | Lesca et al. | 521/79 |
| 5,338,764 | 8/1994 | Lesca et al. | 521/60 |
| 5,409,992 | 4/1995 | Eppert, Jr. | 525/88 |
| 5,411,994 | 5/1995 | Galli et al. | 521/50.5 |
| 5,414,027 | 5/1995 | DeNicola, Jr. et al. | 522/112 |
| 5,433,984 | * 7/1995 | Ilenda et al. | 428/36.6 |
| 5,455,300 | 10/1995 | Smith | 525/74 |
| 5,486,419 | 1/1996 | Clementini et al. | 428/397 |
| 5,637,366 | * 6/1997 | Davis et al. | 428/35.8 |
| 5,731,093 | * 3/1998 | Chang et al. | 428/463 |
| 5,859,104 | * 1/1999 | Becker | 524/236 |
| 5,916,672 | * 6/1999 | Reeves et al. | 428/319.9 |
| 5,976,652 | * 11/1999 | Ilenda et al. | 428/35.9 |

FOREIGN PATENT DOCUMENTS

| | | |
|---|---|---|
| 231013 | 8/1987 | (EP) . |
| 353496 | 2/1990 | (EP) . |
| 605235 | 7/1994 | (EP) . |
| 659551 | 6/1995 | (EP) . |
| 2415535 | 8/1979 | (FR) . |
| 2063899 | 6/1981 | (GB) . |
| WO 91/03372 | 3/1991 | (WO) . |
| WO 94/05493 | * 3/1994 | (WO) . |
| WO 95/24449 | 9/1995 | (WO) . |
| WO 98/01294 | 1/1998 | (WO) . |
| WO 98/48962 | 11/1998 | (WO) . |

OTHER PUBLICATIONS

Derwent Abstract, Accession No. 1993–297636, of Japanese Patent Publication No. 05–208442 (1993).
Derwent Abstract, Accession No. 1994–173313, of Japanese Patent Publication No. 6–115025 (1994).
Derwent Abstract, Accession No. 1995–019350, of Japanese Patent Publication No. 6–306187 (1995).
Derwent Abstract, Accession No. 1994–103909, of Japanese Patent Publication No. 6–048,220 (1994).
Derwent Abstract, Accession No. 1997–072569, of Japanese Patent Publication No. 8–318,602 (1996).
Derwent Abstract, Accession No. 1988–187987, of Japanese Patent Publication No. 63–126,739 (1988).
Derwent Abstract, Accession No. 1996–366999, of Japanese Patent Publication No. 8–174737 (1996).
Derwent Abstract, Accession No. 1983–52954K, of Japanese Patent Publication No. 58–069021 (1983).
Derwent Abstract, Accession No. 1995–331972, of Japanese Patent Publication No. 7–227,930 (1995).
Derwent Abstract, Accession No. 1991–101949, of Japanese Patent Publication No. 9–262921 (Oct. 7, 1997).
Derwent Abstract, Accession No. 1998–153374, of Japanese Patent Publication No. 10–024540 (Jan. 27, 1998).
Derwent Abstract, Accession No. 1996–021202, of German Patent Publication No. 44 19 162 (1995).
Derwent Abstract, Accession No. 1995–037006, of German Patent Publication No. 43 20 636 (1995).
Derwent Abstract; Derwent Accession No.:1994–084230, Mar. 1994.*

* cited by examiner

Primary Examiner—Paul Thibodeau
Assistant Examiner—Sheeba Ahmed

(57) ABSTRACT

A co-extruded polyolefin laminate having a hard, high modulus top layer includes at least one layer of a graft copolymer made from a propylene polymer material onto which is graft polymerized acrylic and/or styrenic monomers and at least one other layer made from a propylene homopolymer, a random propylene copolymer, a random propylene terpolymer, an olefin polymer composition, a thermoplastic olefin, a heterophasic olefin composition, or combinations of two or more of these polymers or polymer compositions, optionally blended with a high melt strength propylene polymer material. Composite materials including at least one layer of the co-extruded laminate and, for example, a low density polyolefin foam layer, can be used to make large structural parts by conventional means such as thermoforming.

29 Claims, No Drawings

US 6,218,023 B1

CO-EXTRUDED LAMINATE COMPRISING AT LEAST ONE PROPYLENE GRAFT COPOLYMER LAYER

FIELD OF THE INVENTION

This invention relates to co-extruded laminates of polyolefin materials containing at least one layer of a propylene graft copolymer, and at least one layer of a polyolefin material.

BACKGROUND OF THE INVENTION

Currently structural parts, especially large structural parts, are typically made from an acrylonitrile/butadiene/styrene rubber (ABS). When weatherability is required, a laminate of ABS and a layer of acrylonitrile/styrene/acrylic resin (ASA) or an acrylic resin is used. These materials have only adequate weatherability, poor chemical resistance, and a high density, which is a disadvantage when used in applications such as co-extruded profiles; boat hulls and boat decks as well as boat engine covers, consoles, and hatches; indoor and outdoor whirlpool tubs or hot tubs; swimming pools; camper tops; household appliance cabinets and door liners; pick-up truck caps; structural and body components of golf carts; sinks; tractor hoods; automobile body panels; outdoor portable toilets; shower stalls; sinks; wall panels; counter tops, and equipment housings.

Laminates have also been produced from various combinations of polyolefin materials. However, they lack the required rigidity, scratch and mar resistance, and gloss after thermoforming.

SUMMARY OF THE INVENTION

The co-extruded laminate of the present invention comprises:

(1) at least one layer of a graft copolymer comprising a backbone of a propylene polymer material, having graft polymerized thereto polymerized monomers selected from the group consisting of
  (a) at least one acrylic monomer,
  (b) at least one styrenic monomer, and
  (c) mixtures of (a) and (b), and
(2) at least one layer of a polyolefin material selected from the group consisting of:
  (a) a crystalline homopolymer of propylene having an isotactic index greater than 80;
  (b) a crystalline random copolymer of propylene and an olefin selected from the group consisting of ethylene and $C_4$–$C_{10}$ α-olefins, provided that when the olefin is ethylene, the maximum polymerized ethylene content is 10% by weight, and when the olefin is a $C_4$–$C_{10}$ α-olefin, the maximum polymerized content thereof is 20% by weight, the copolymer having an isotactic index greater than 85;
  (c) a crystalline random terpolymer of propylene and two olefins selected from the group consisting of ethylene and $C_4$–$C_8$ α-olefins, provided that the maximum polymerized $C_4$–$C_8$ α-olefin content is 20% by weight, and, when ethylene is one of the olefins, the maximum polymerized ethylene content is 5% by weight, the terpolymer having an isotactic index greater than 85;
  (d) an olefin polymer composition comprising:
    (i) about 10 parts to about 60 parts by weight of a crystalline propylene homopolymer having an isotactic index greater than 80, or a crystalline copolymer selected from the group consisting of (a) propylene and ethylene, (b) propylene, ethylene and a $C_4$–$C_8$ α-olefin, and (c) propylene and a $C_4$–$C_8$ α-olefin, the copolymer having a propylene content of more than 85% by weight and an isotactic index greater than 85;
    (ii) about 5 parts to about 25 parts by weight of a copolymer of ethylene and propylene or a $C_4$–$C_8$ α-olefin that is insoluble in xylene at ambient temperature; and
    (iii) about 30 parts to about 70 parts by weight of an elastomeric copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing about 0.5% to about 10% by weight of a diene, and containing less than 70% by weight of ethylene and being soluble in xylene at ambient temperature and having an intrinsic viscosity of about 1.5 to about 4.0 dl/g;
  the total of (ii) and (iii), based on the total olefin polymer composition being from about 50% to about 90%, and the weight ratio of (ii)/(iii) being less than 0.4, wherein the composition is prepared by polymerization in at least two stages and has a flexural modulus of less than 150 MPa;
  (e) a thermoplastic olefin comprising:
    (i) about 10% to about 60% of a propylene homopolymer having an isotactic index greater than 80, or a crystalline copolymer selected from the group consisting of (a) ethylene and propylene, (b) ethylene, propylene and a $C_4$–$C_8$ α-olefin, and (c) ethylene and a $C_4$–$C_8$ α-olefin, the copolymer having a propylene content greater than 85% and an isotactic index of greater than 85%;
    (ii) about 20% to about 60% of an amorphous copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing about 0.5% to about 10% of a diene and containing less than 70% ethylene and being soluble in xylene at ambient temperature; and
    (iii) about 3% to about 40% of a copolymer of ethylene and propylene or a $C_4$–$C_8$ α-olefin that is insoluble in xylene at ambient temperature,
  wherein the composition has a flexural modulus of greater than 150 but less than 1200 MPa;
  (f) a heterophasic polyolefin composition comprising:
    (i) about 30% to about 98% of a polymeric material selected from the group consisting of a polypropylene homopolymer having an isotactic index greater than 90, and a crystalline copolymer having an isotactic index greater than 85 of propylene and at least one α-olefin of the formula $CH_2=CHR$, where R is H or a $C_2$–$C_6$ alkyl group, the α-olefin being less than 10% of the copolymer when R is H and being less than 20% when R is a $C_2$–$C_6$ alkyl group or a combination thereof with RαH, and
    (ii) about 2% to about 70% of an elastomeric copolymer of propylene and an α-olefin of the formula $CH_2=CHR$, where R is H or a $C_2$–$C_8$ alkyl group, the α-olefin being about 45% to about 75% of the elastomeric copolymer, and about 10% to about 40% of the elastomeric copolymer being insoluble in xylene at ambient temperature, or an elastomeric copolymer of ethylene and a $C_4$–$C_8$ α-olefin having an α-olefin content of about 15% to about 60%;

(g) mixtures of two or more of (2)(a) to(2)(f); and (h) mixtures of one or more of (2)(a) to (2)(g) and about 5% to about 40% of a high melt strength propylene polymer material having strain hardening elongational viscosity, and wherein about 5% to about 85% of the total thickness of the laminate comprises the graft copolymer layer (1).

The co-extruded laminates of this invention have a lower density, better weather resistance, better chemical resistance, greater toughness, and better scratch and mar resistance than materials currently available for making large thermoformed structural parts. They can also be recycled, have good thermal processing stability, are easy to pigment, and can be buffed or sanded to remove scratches. Any number of materials can be selected for the various layers, making it possible to design a wide variety of materials with whatever combination of properties is desired in the finished product. This combination of properties is not possible when using a single layer sheet.

Composite materials comprising at least one layer of this laminate attached to a low density polyolefin foam layer are another embodiment of this invention.

DETAILED DESCRIPTION OF THE INVENTION

The propylene polymer material that is used as the backbone of the graft copolymer in layer (1) of the laminate of this invention can be:

(a) a crystalline homopolymer of propylene having an isotactic index greater than 80, preferably about 85 to about 99;

(b) a crystalline random copolymer of propylene and an olefin selected from the group consisting of ethylene and $C_4$–$C_{10}$ α-olefins, provided that when the olefin is ethylene, the maximum polymerized ethylene content is 10% by weight, preferably about 4%, and when the olefin is a $C_4$–$C_{10}$ α-olefin, the maximum polymerized content thereof is 20% by weight, preferably about 16%, the copolymer having an isotactic index greater than 85;

(c) a crystalline random terpolymer of propylene and two olefins selected from the group consisting of ethylene and $C_4$–$C_8$ α-olefins, provided that the maximum polymerized $C_4$–$C_8$ α-olefin content is 20% by weight, preferably about 16%, and, when ethylene is one of the olefins, the maximum polymerized ethylene content is 5% by weight, preferably about 4%, the terpolymer having an isotactic index greater than 85;

(d) an olefin polymer composition comprising:
(i) about 10 parts to about 60 parts by weight, preferably about 15 parts to about 55 parts, of a crystalline propylene homopolymer having an isotactic index greater than 80, preferably about 85 to about 98, or a crystalline copolymer selected from the group consisting of (a) propylene and ethylene, (b) propylene, ethylene and a $C_4$–$C_8$ α-olefin, and (c) propylene and a $C_4$–$C_8$ α-olefin, the copolymer having a propylene content of more than 85% by weight, preferably about 90% to about 99%, and an isotactic index greater than 85;
(ii) about 5 parts to about 25 parts by weight, preferably about 5 parts to about 20 parts, of a copolymer of ethylene and propylene or a $C_4$–$C_8$ α-olefin that is insoluble in xylene at ambient temperature; and
(iii) about 30 parts to about 70 parts by weight, preferably about 20 parts to about 65 parts, of an elastomeric copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing about 0.5% to about 10% by weight of a diene, and containing less than 70% by weight, preferably about 10% to about 60%, most preferably about 12% to about 55%, of ethylene and being soluble in xylene at ambient temperature and having an intrinsic viscosity of about 1.5 to about 4.0 dl/g;

the total of (ii) and (iii), based on the total olefin polymer composition being from about 50% to about 90%, and the weight ratio of (ii)/(iii) being less than 0.4, preferably 0.1 to 0.3, wherein the composition is prepared by polymerization in at least two stages and has a flexural modulus of less than 150 MPa; and (e) a thermoplastic olefin comprising:
(i) about 10% to about 60%, preferably about 20% to about 50%, of a propylene homopolymer having an isotactic index greater than 80, or a crystalline copolymer selected from the group consisting of (a) ethylene and propylene, (b) ethylene, propylene and a $C_4$–$C_8$ α-olefin, and (c) ethylene and a $C_4$–$C_8$ α-olefin, the copolymer having a propylene content greater than 85% and an isotactic index of greater than 85%;
(ii) about 20% to about 60%, preferably about 30% to about 50%, of an amorphous copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing about 0.5% to about 10% of a diene, and containing less than 70% ethylene and being soluble in xylene at ambient temperature; and
(iii) about 3% to about 40%, preferably about 10% to about 20%, of a copolymer of ethylene and propylene or a $C_4$–$C_8$ α-olefin that is insoluble in xylene at ambient temperature, wherein the composition has a flexural modulus of greater than 150 but less than 1200 MPa, preferably about 200 to about 1100 MPa, most preferably about 200 to about 1000 MPa.

Room or ambient temperature is ~25° C.

The $C_{4-8}$ α-olefins useful in the preparation of (1)(d) and (1)(e) include, for example, butene-1; pentene-1; hexene-1; 4methyl-1-pentene, and octene-1.

The diene, when present, is typically a butadiene; 1,4-hexadiene; 1,5-hexadiene, or ethylidenenorbornene.

Propylene polymer materials (1)(d) and (1)(e) can be prepared by polymerization in at least two stages, where in the first stage the propylene, or propylene and ethylene or an α-olefin, or propylene, ethylene and an α-olefin are polymerized to form component (i) of (1)(d) or (1)(e), and in the following stages the mixtures of ethylene and propylene or the α-olefin, or ethylene, propylene and the α-olefin, and optionally a diene, are polymerized to form components (ii) and (iii) of (1)(d) or (1)(e).

The polymerization can be conducted in liquid phase, gas phase, or liquid-gas phase using separate reactors, all of which can be done either by batch or continuously. For example, it is possible to carry out the polymerization of component (i) using liquid propylene as a diluent, and the polymerization of components (ii) and (iii) in gas phase, without intermediate stages except for the partial degassing of the propylene. All gas phase is the preferred method.

The preparation of propylene polymer material (1)(d) is described in more detail in U.S. Pat. Nos. 5,212,246 and 5,409,992, which preparation is incorporated herein by reference. The preparation of propylene polymer material (1)(e) is described in more detail in U.S. Pat. Nos. 5,302,454 and 5,409,992, which preparation is incorporated herein by reference.

Acrylic monomers that can be graft polymerized onto the propylene polymer material backbone include, for example, acrylic acid; acrylate esters, such as the methyl, ethyl, hydroxyethyl, 2-ethylhexyl, and butyl acrylate esters; methacrylic acid, and methacrylate esters such as the methyl, ethyl, butyl, benzyl, phenylethyl, phenoxyethyl, epoxypropyl, hydroxypropyl methacrylate esters, and mixtures thereof.

The styrenic monomers that can be graft polymerized onto the propylene polymer material backbone include styrene and alkyl or alkoxy ring-substituted styrenes where the alkyl or alkoxy group is a $C_{1-4}$ linear or branched alkyl or alkoxy group, and mixtures thereof.

When a mixture of acrylic and styrenic monomers is used, the ratio of acrylic to styrenic monomers can be about 95/5 to about 5/95.

During the graft polymerization, the monomers also polymerize to form a certain amount of free or ungrafted polymer or copolymer. Any reference to "polymerized monomers" in this specification is meant to include both grafted and ungrafted polymerized monomers. The polymerized monomers comprise from about 10 parts to about 120 parts per hundred parts of the propylene polymer material, preferably about 30 to about 95 pph. The morphology of the graft copolymer is such that the propylene polymer material is the continuous or matrix phase, and the polymerized monomers, both grafted and ungrafted, are a dispersed phase.

The graft copolymer can be made according to any one of various methods. One of these methods involves forming active grafting sites on the propylene polymer material either in the presence of the grafting monomers, or followed by treatment with the monomers. The grafting sites can be produced by treatment with a peroxide or other chemical compound that is a free radical polymerization initiator, or by irradiation with high energy ionizing radiation. The free radicals produced on the polymer as a result of the chemical or irradiation treatment form the active grafting sites on the polymer and initiate the polymerization of the monomers at these sites. Graft copolymers produced by peroxide-initiated grafting methods are preferred.

Preparation of graft copolymers by contacting the polypropylene with a free radical polymerization initiator such as an organic peroxide and a vinyl monomer is described in more detail in U.S. Pat. No. 5,140,074, which preparation is incorporated herein by reference. Preparation of graft copolymers by irradiating an olefin polymer and then treating with a vinyl monomer is described in more detail in U.S. Pat. No. 5,411,994, which preparation is incorporated herein by reference.

The graft copolymer layer (1) can also optionally comprise a rubber component selected from one or more of the group consisting of (i) an olefin copolymer rubber, (ii) a monoalkenyl aromatic hydrocarbon-conjugated diene block copolymer rubber, and (iii) a core-shell rubber. Any of these rubber components can have acid or anhydride functionality or can be free of these functional groups. The preferred rubber components are (i) and (ii), either alone or in combination.

When present, the rubber component is used in an amount of about 2% to about 40%, preferably about 2% to about 15%, by weight.

Suitable polyolefin rubbers include, for example, saturated polyolefin rubbers such as ethylene/propylene monomer rubbers (EPM), ethylene/octene-1, and ethylene/butene-1 rubbers, and unsaturated polyolefin rubbers such as ethylene/propylene/diene monomer rubbers (EPDM). The preferred olefin copolymer rubbers are ethylene/propylene, ethylene/butene-1, and ethylene/octene-1 copolymers. The most preferred rubbers for use with an acrylic-grafted polypropylene material are ethylene/butene-1 and ethylene/octene-1 copolymer rubbers. The most preferred rubbers for use with a styrenic-grafted propylene polymer material are ethylene/propylene, ethylene/butene-1, ethylene/octene-1, or a combination of either of these rubbers with a block copolymer rubber.

The monoalkenyl aromatic hydrocarbon-conjugated diene block copolymer can be a thermoplastic elastomer of the A-B (or diblock) structure, the linear A-B-A (or triblock) structure, the radial $(A-B)_n$ type where n=3–20%, or a combination of these structure types, wherein each A block is a monoalkenyl aromatic hydrocarbon polymer block, and each B block is an unsaturated rubber block. Various grades of copolymers of this type are commercially available. The grades differ in structure, molecular weight of the mid and end blocks, and ratio of monoalkenyl aromatic hydrocarbon to rubber. The block copolymer can also be hydrogenated. Typical monoalkenyl aromatic hydrocarbon monomers are styrene, ring-substituted $C_1$–$C_4$ linear or branched alkyl styrenes, and vinyltoluene. Styrene is preferred. Suitable conjugated dienes include, for example, butadiene and isoprene. Preferred block copolymers are hydrogenated styrene/ethylene-butene-1/styrene triblock copolymers.

The weight average molecular weight, $M_w$, of the block copolymers generally will be in the range of about 45,000 to about 260,000 g/mole, $M_w$ of about 50,000 to about 125,000 g/mole being preferred on the basis that they afford blend compositions having the best balance of impact strength and stiffness. Also, while block copolymers having unsaturated as well as saturated rubber blocks can be used, copolymers having saturated rubber blocks are preferred, also on the basis of the impact/stiffness balance of the compositions containing them. The weight ratio of monoalkenyl aromatic hydrocarbon to conjugated diene rubber in the block copolymer is in the range of about 5/95 to about 50/50, preferably about 10/90 to about 40/60.

The core-shell rubber components comprise small particles of crosslinked rubber phase surrounded by a compatibilizing shell, normally a glassy polymer or copolymer. The core is typically a diene rubber such as butadiene or isoprene, or an acrylate. The shell is typically a polymer of two or more monomers selected from styrene, methyl methacrylate, and acrylonitrile. Particularly preferred core-shell rubbers have an acrylate core.

Another optional ingredient in layer (1) is a propylene polymer material. When present, it is used in an amount of about 5% to about 70%, preferably about 10% to about 50%, most preferably about 10% to about 30%, by weight. If this optional ingredient is present, it is selected from the same propylene polymer materials that can be used as the backbone polymer for the graft copolymer, and it can be the same material as the propylene polymer backbone used to prepare the graft copolymer or a different propylene polymer material.

The preferred propylene polymer material is a propylene homopolymer having a broad molecular weight distribution (BMWD PP). The BMWD PP has a MJ/M. of about 5 to about 60, preferably about 5 to about 40; a melt flow rate of about 0.5 to about 50, preferably about 1 to about 30 g/10 min, and xylene insolubles at 25° C. of greater than or equal to 94%, preferably greater than or equal to 96%, and most preferably greater than or equal to 98%. The propylene polymer material having a broad molecular weight distribution can be a homopolymer of propylene or an ethylene/propylene rubber impact-modified homopolymer of propylene, wherein the propylene homopolymer has a broad molecular weight distribution.

The BMWD propylene polymer material can be prepared by sequential polymerization in at least two stages, in the presence of a Ziegler-Natta catalyst supported on magnesium halide in active form. The polymerization process occurs in separate and consecutive stages, and in each stage polymerization takes place in the presence of the polymer and the catalyst coming from the preceding stage.

The polymerization process can be carried out in a batch or in a continuous mode according to known techniques, operating in liquid phase in the presence or not of an inert diluent, or in gas phase, or liquid-gas phase, preferably in gas phase. The preparation of the BMWD propylene polymer material is described in more detail in U.S. Pat. No. 5,286,791, which preparation is incorporated herein by reference.

Either the optional rubber component or the optional ungrafted propylene polymer material can be used by itself, or both of the optional components can be added.

About 5% to about 85% of the total thickness of the laminate comprises the graft copolymer layer.

The polyolefin materials that can be used in layer (2) of the laminate of this invention are selected from the group consisting of:

(a) a crystalline homopolymer of propylene having an isotactic index greater than 80, preferably about 85 to about 99;

(b) a crystalline random copolymer of propylene and an olefin selected from the group consisting of ethylene and $C_4$–$C_{10}$ α-olefins, provided that when the olefin is ethylene, the maximum polymerized ethylene content is 10% by weight, preferably about 4%, and when the olefin is a $C_4$–$C_{10}$ α-olefin, the maximum polymerized content thereof is 20% by weight, preferably about 16%, the copolymer having an isotactic index greater than 85;

(c) a crystalline random terpolymer of propylene and two olefins selected from the group consisting of ethylene and $C_4$–$C_8$ α-olefins, provided that the maximum polymerized $C_4$–$C_8$ α-olefin content is 20% by weight, preferably about 16%, and, when ethylene is one of the olefins, the maximum polymerized ethylene content is 5% by weight, preferably about 4%, the terpolymer having an isotactic index greater than 85;

(d) an olefin polymer composition comprising:
  (i) about 10 parts to about 60 parts by weight, preferably about 15 parts to about 55 parts, of a crystalline propylene homopolymer having an isotactic index greater than 80, or a crystalline copolymer selected from the group consisting of (a) propylene and ethylene, (b) propylene, ethylene and a $C_4$–$C_8$ α-olefin, and (c) propylene and a $C_4$–$C_8$ α-olefin, the copolymer having a propylene content of more than 85% by weight and an isotactic index greater than 85;
  (ii) about 5 parts to about 25 parts by weight, preferably about 5 parts to about 20 parts, of a copolymer of ethylene and propylene or a $C_4$–$C_8$ α-olefin that is insoluble in xylene at ambient temperature; and
  (iii) about 30 parts to about 70 parts by weight, preferably about 20 parts to about 65 parts, of an elastomeric copolymer selected from the group consisting of (a) ethylene and propylene, (b) ethylene, propylene, and a $C_4$–$C_8$ α-olefin, and (c) ethylene and a $C_4\alpha C_8$ α-olefin, the copolymer optionally containing about 0.5% to about 10% by weight of a diene, and containing less than 70% by weight of ethylene and being soluble in xylene at ambient temperature and having an intrinsic viscosity of about 1.5 to about 4.0 dl/g; the total of (ii) and (iii), based on the total olefin polymer composition, being from about 50% to about 90%, and the weight ratio of (ii)/(iii) being less than 0.4, wherein the composition is prepared by polymerization in at least two stages and has a flexural modulus of less than 150 MPa;

(e) a thermoplastic olefin comprising:
  (i) about 10% to about 60%, preferably about 20% to about 50%, of a propylene homopolymer having an isotactic index greater than 80, or a crystalline copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer having a propylene content greater than 85% and an isotactic index of greater than 85%;
  (ii) about 20% to about 60%, preferably about 30% to about 50%, of an amorphous copolymer selected from the group consisting of (a) ethylene and propylene, (b) ethylene, propylene and a $C_4$–$C_8$ α-olefin, and (c) ethylene and a $C_4$–$C_8$ α-olefin, the copolymer optionally containing about 0.5% to about 10% of a diene, and containing less than 70% ethylene and being soluble in xylene at ambient temperature, and
  (iii) about 3% to about 40%, preferably about 10% to about 20%, of a copolymer of ethylene and propylene or a $C_4$–$C_8$ α-olefin that is insoluble in xylene at ambient temperature,
wherein the composition has a flexural modulus of greater than 150 but less than 1200 MPa, preferably about 200 to about 1100 MPa, and most preferably about 200 to about 1000 MPa;

(f) a heterophasic polyolefin composition comprising:
  (i) about 30% to about 98%, preferably about 60% to about 80%, of a polymeric material selected from the group consisting of a polypropylene homopolymer having an isotactic index greater than 90, and a crystalline copolymer having an isotactic index greater than 85 of propylene and at least one α-olefin of the formula $CH_2=CHR$, where R is H or a $C_2$–$C_6$ alkyl group, the α-olefin being less than 10% of the copolymer when R is H, and being less than 20% when R is a $C_2$–$C_6$ alkyl group or a combination thereof with R H; and
  (ii) about 2% to about 70%, preferably about 20% to about 40%, of an elastomeric copolymer of propylene and an α-olefin of the formula $CH_2=CHR$, where R is H or a $C_2$–$C_8$ alkyl group, having an α-olefin content of about 45% to about 75%, preferably about 50% to about 70%, and most preferably about 60% to about 70%, of the elastomeric copolymer, and about 10% to about 40% of the elastomeric copolymer being insoluble in xylene at ambient temperature, or an elastomeric copolymer of ethylene and a $C_4$–$C_8$ α-olefin having an α-olefin content of about 15% to about 60%, preferably about 15% to about 40%;

(g) mixtures of two or more of (2)(a) to(2)(f); and (h) mixtures of one or more of (2)(a) to (2)(g) with about 5% to about 40% of a high melt strength propylene polymer material having strain hardening elongational viscosity.

Room or ambient temperature is –25° C.

The total amount of polymerized ethylene in (2)(d) is preferably about 10% to about 40% by weight.

The $C_{4-8}$ α-olefins useful in the preparation of (2)(d) and (2)(e) include, for example, butene-1; pentene-1; hexene-1; 4-methyl-1-pentene, and octene-1.

The diene, when present, is typically a butadiene; 1,4-hexadiene; 1,5-hexadiene; or ethylidenenorbornene.

Propylene polymer materials (2)(d) and (2)(e) can be prepared by polymerization in at least two stages, where in the first stage the propylene, or propylene and ethylene or α-olefin, or propylene, ethylene and the α-olefin are polymerized to form component (i) of (2)(d) or (2)(e), and in the following stages the mixtures of ethylene and propylene or the α-olefin, or ethylene, propylene and the α-olefin, and optionally a diene, are polymerized to form components (ii) and (iii) of (2)(d) or (2)(e).

The polymerization can be conducted in liquid phase, gas phase, or liquid-gas phase using separate reactors, all of which can be done either by batch or continuously. For example, it is possible to carry out the polymerization of component (i) using liquid propylene as a diluent, and the polymerization of components (ii) and (iii) in gas phase, without intermediate stages except for the partial degassing of the propylene. All gas phase is the preferred method.

The preparation of propylene polymer material (2)(d) is described in more detail in U.S. Pat. Nos. 5,212,246 and 5,409,992, which preparation is incorporated herein by reference. The preparation of propylene polymer material (2)(e) is described in more detail in U.S. Pat. Nos. 5,302,454 and 5,409,992, which preparation is incorporated herein by reference.

The $C_2$–$C_8$ olefins in (2)(f) include linear and branched α-olefins such as, for example, 1-butene; isobutylene; 1-pentene; 1-hexene; 1-octene; 3-methyl-1-butene; 4-methyl-1-pentene; 3,4-dimethyl-1-butene, and 3-methyl-1-hexene.

The heterophasic polyolefin composition (2)(f) can be obtained by sequential polymerization of monomers in the presence of Ziegler-Natta catalysts, or by mechanical blending of components (i) and (ii). The sequential polymerization process is described in more detail in U.S. Pat. No. 5,486,419, which preparation is incorporated herein by reference.

The high melt strength propylene polymer material used in (2)(h) is preferably a normally solid, high molecular weight, gel-free, predominantly isotactic, semi-crystalline propylene polymer material, the branching index of which is less than 1, that has strain hardening elongational viscosity.

The branching index quantifies the degree of long chain branching. In preferred embodiments the branching index of the propylene polymer material in (2)(h) is preferably less than about 0.9, and most preferably about 0.3 to 0.5. It is defined by the equation:

$$g' = \frac{[IV]_{Br}}{[IV]_{Lin}}\bigg|_{M_w}$$

in which g' is the branching index, $[MV]_{Br}$ is the intrinsic viscosity of the branched propylene polymer material, and $[IV]_{Lin}$ is the intrinsic viscosity of a normally solid, predominantly isotactic, semi-crystalline, linear propylene polymer material of substantially the same weight average molecular weight, and, in the case of copolymers and terpolymers, substantially the same relative molecular proportion or proportions of monomer units.

Intrinsic viscosity, also known as the limiting viscosity number, in its most general sense is a measure of the capacity of a polymer molecule to enhance the viscosity of a solution. This depends on both the size and the shape of the dissolved polymer molecule. In comparing a non-linear polymer with a linear polymer of substantially the same weight average molecular weight, the intrinsic viscosity is an indication of the configuration of the non-linear polymer molecule. The above ratio of intrinsic viscosities is a measure of the degree of branching of the non-linear polymer. A method for determining the intrinsic viscosity of propylene polymer materials is described by Elliott et al., J. App. Poly. Sci., 14, 2947–2963 (1970). The intrinsic viscosity is determined with the polymer dissolved in decahydronaphthalene at 135° C.

Weight average molecular weight can be measured by various procedures. However, the procedure preferably used here is that of low angle laser light scattering photometry, which is disclosed by McConnell in Am. Lab., May 1978, in the article entitled "Polymer Molecular Weights and Molecular Weight Distribution by Low-Angle Laser Light Scattering".

Elongational viscosity is the resistance of a fluid or semi-fluid substance to elongation. It is a melt property of a thermoplastic material that can be determined by an instrument that measures the stress and strain of a specimen in the melt state when subjected to tensile strain at a constant rate. One such instrument is described and shown in FIG. 1 of Munstedt, J. Rheology, 23, (4), 421–425 (1979). A commercial instrument of similar design is the Rheometrics RER-9000 extensional rheometer. Molten, high molecular weight, linear propylene polymer material exhibits elongational viscosity which, as it is elongated or drawn at a constant rate from a relatively fixed point, tends to increase for a distance dependent on the rate of elongation, and then to decrease rapidly until it thins to nothing- so-called ductile or necking failure. On the other hand, the molten propylene polymer material of this invention, that is of substantially the same weight average molecular weight and at substantially the same test temperature as the corresponding molten, high molecular weight, linear, propylene polymer material, exhibits elongational viscosity which, as it is elongated or drawn from a relatively fixed point at substantially the same rate of elongation tends to increase over a longer distance, and to break or fail by fracture- so-called brittle or elastic failure. These characteristics are indicative of strain hardening. The more long chain branching the propylene polymer material of this invention has, the greater the tendency of the elongational viscosity to increase as the elongated material approaches failure. This latter tendency is most evident when the branching index is less than about 0.8.

The high melt strength polymers can be made by treating a normally solid, amorphous to predominantly crystalline propylene polymer material without strain hardening elongational viscosity with a low decomposition temperature peroxide or with high energy ionizing radiation in the substantial absence of atmospheric oxygen, for example, in an environment in which an active oxygen concentration of less than about 15% by volume is maintained. The peroxide-treated or irradiated propylene polymer material is then heated or treated with a free radical scavenger in the substantial absence of atmospheric oxygen to deactivate substantially all of the free radicals present in the propylene polymer material. The propylene polymer material can be any of the polyolefin materials (a) to (g) listed as suitable for use in layer (2).

The preparation of these high melt strength propylene polymer materials having strain hardening elongational viscosity is described in more detail in U.S. Pat. No. 5,047,446; 5,047,485 and 5,414,027, which preparations are incorporated herein by reference.

Alternatively, the propylene polymer material used in (2)(h) can be characterized by at least (a) either a $M_z$ of at least $1.0 \times 10^6$ or a $M_z/M_w$ ratio of at least 3.0, and (b) either an equilibrium compliance $J_{eo}$ of at least $12 \times 10^{-5}$ cm$^2$/dyne or a recoverable shear strain per unit stress Sr/S of at least $5 \times 10^{-5}$ cm$^2$/dyne at 1 sec$^{-1}$.

The molecular weight distribution in a sample of the propylene polymer material can be determined by high temperature gel permeation chromatography (GPC). The Waters 150 CV GPC chromatograph can be used at 135° C. with trichlorobenzene as the carrier solvent and a set of Waters $\mu$-Styragel HT, $10^3$, $10^4$, $10^5$ and $10^6$ columns. The solution concentration is 0.2% (w/v) and the flow rate is 1 ml/min.

The Theological characterization of the propylene polymer materials can be conducted with a programmed Rheometrics Mechanical Spectrometer (RMS-800). Resin pellets are compression molded into sheets from which samples are stamped out with a 25 mm diameter circular die. Tests are conducted at 210±1° C. using 25 m parallel plate geometry with a 1.4 mm gap. Creep data are obtained under a constant stress of 1000 dyne/cm$^2$ for a period of 0–300 sec. The creep compliance J(t) is given by $$J(t) = \tau(t)/\sigma_0 = J_{eo} + t/\eta_o$$

where $\tau$=strain $\sigma_o$=stress $J_{eo}$=equilibrium compliance $\eta_o$=zero shear viscosity The equilibrium compliance $J_{eo}$ is a measure of melt elasticity and is determined by first plotting strain against time at constant stress. The strain as a function of time is divided by the stress to give J(t). $J_{eo}$ is the intercept of the J(t) against time plot.

The recoverable shear strain per unit stress Sr/S also distinguishes the high melt strength propylene polymer materials. This quantity is a fundamental measure of melt elasticity. Using the programmed Rheometrics Mechanical Spectrometer, the polymer melt is subjected to clockwise rotational shear strain by the driver and the resulting shear stress S and first normal stress $N_1$ are measured by a transducer. The shear rate range is 0.01 to 10 s$^{-1}$, the time before measurement is 2.2 min and the time of the measurement is 0.3 min. Normal stress measurements are obtained at each shear rate. The recoverable shear strain Sr is obtained from the first normal stress difference $N_1$.

$$Sr = \frac{N_1}{2S}$$

The normalized quantity Sr/S, i.e., recoverable shear strain per unit stress is a measure of melt elasticity.

Additives such as fillers and reinforcing agents, pigments, slip agents, waxes, oils, antiblocking agents, and antioxidants can also be present in the compositions used to form the layers of the laminates of this invention.

In the laminates of this invention, many combinations of layers (1) and (2) are contemplated, for example, I-II, I-II-III, and I-II-I, in which I is the graft copolymer, I is one of the polyolefin materials (2)(a)–(2)(h), and III is a polyolefin material selected from (2)(a)–(2)(h) that is different than II. In the laminates of this invention, layer (1) comprises about 5% to about 85% of the total thickness of the laminate, which is about 50 mils to about 500 mils.

A preferred two layer laminate comprises a methyl methacrylate/methyl acrylate copolymer, a methyl methacrylate/styrene copolymer, or a polymerized styrenic monomer for layer (1), and a mixture of an impact-modified polypropylene and 5–30% of a-high melt strength propylene homopolymer having strain hardening elongational viscosity for layer (2). Preferred three layer laminates are I-II-I and I-II-III, where I is a methyl methacrylate/methyl acrylate copolymer, a methyl methacrylate/styrene copolymer, or a polymerized styrenic monomer; II is the olefin polymer composition (2)(d), and III is an impact-modified polypropylene. The impact-modified polypropylene can be (1) the heterophasic polyolefin composition (2)(f), where fraction (ii) is an ethylene/propylene copolymer, (2) a blend of propylene homopolymer and an ethylene/propylene, ethylene/butene, or ethylene/octene copolymer rubber, or mixtures thereof, (3) a blend of the polyolefin composition (2)(d) and (1) or (2) above, or (4) a blend of the high melt strength propylene polymer material in (2)(h) and (1), (2) or (3) above.

The laminates can be made by co-extruding the various layers, or a molded part can be made by co-injection molding or thermoforming the laminate.

Co-injection molding is well known to those skilled in the art and means that two or more different thermoplastic materials are "laminated" together as described in Rosato et al., *Injection Molding Handbook*, 2$^{nd}$ Ed., Chapman & Hall, 1008–1011 (1995). Two or more injection units are required, with each material having its own injection unit. The materials can be injected into specially designed molds such as, for example, rotary and shuttle molds. The sandwich configuration that results takes advantage of the different properties that each material contributes to the structure. There are three techniques for molding multicomponent parts called the one-, two-, and three-channel techniques. In the one-channel system, the plastic melts for the compact skins and foam core are injected into the mold one after another by shifting a valve. The two-channel system allows the formation of the compact skin and core material simultaneously. The three-channel system allows simultaneous injection, using a direct sprue gating, of the compact skin and core (foamable or solid).

The thermoforming process is well known to those skilled in the art and is described, for example, in D. V. Rosato, *Rosato's Plastics Encyclopedia and Dictionary*, Hanser Publishers, 755–757 (1993). The process usually consists of heating a thermoplastic sheet, film, or profile to its softening temperature and forcing the hot and flexible material against the contours of a mold by pneumatic means (differentials in air pressure are created by pulling a vacuum between the plastic and the mold, or the pressure of compressed air is used to force the material against the mold), mechanical means (plug or matched mold, for example), or combinations of pneumatic and mechanical means. The process involves (1) heating the sheet in a separate oven and then transferring the hot sheet to a forming press, (2) using automatic machinery to combine heating and forming in a single unit, or (3) a continuous operation feeding off a roll of thermoplastic material or directly from the exit of an extruder die (postforming).

The laminates of this invention exhibit a combination of (1) good gloss, (2) hardness, (3) good plate impact, (4) good thermoformability, and (5) no delamination of layers on impact.

Another embodiment of this invention is a composite material comprising (a) at least one layer of the laminate or the thermoformed article of this invention and (b) a layer of a low density polyolefin foam having a density of about 1 to about 15 $lb/ft^3$ and a thickness of about ⅛ inch to about 4 inches, preferably >1 inch up to 3 inches. The low density foam layer can be an extruded foam sheet, or the layer can be molded from foam beads. The low density foam layer can comprise a single thickness of foam, or several thin layers attached to each other, e.g., thermally, such as by the use of a "hot knife", or by the use of a suitable adhesive such as, for example, low molecular weight polyolefins made from functionalized monomers with polar groups such as monounsaturated carboxylic acids or their anhydride derivatives such as maleic or itaconic acid or their anhydrides, or unfunctionalized monomers; hot melt adhesives, or aqueous- or solvent-based emulsions. Suitable bonding agents include, for example, hydrogenated hydrocarbon resins such as Regalrez series tackifiers, commercially available from Hercules Incorporated, and Arkon P series tackifiers, commercially available from Arakawa Chemical (U.S.A.) Incorporated; 1023PL amorphous polypropylene tackifying agent available from Eastman Chemical Company, and predominantly amorphous ethylene/propylene copolymers commonly known as ethylene/propylene rubber (EPR). Optionally, (c) a sheet of a polyolefin material such as, for example, a polyethylene or polypropylene sheet, can be applied to the other side of the low density foam layer of the composite material.

The laminate or thermoformed article can be attached to the low density foam layer, for example, either thermally or by the use of a suitable adhesive such as those described in the preceding paragraph.

The polyolefin used to make the foam is preferably the same as the high melt strength propylene polymer material having strain hardening elongational viscosity described in (2)(h).

Extruded foam sheets can be made by conventional techniques such as, for example, using a tandem extrusion line. The process consists of mixing polypropylene resin having a high melt strength and high melt elasticity with a nucleating agent in a primary extruder, kneading the mixture, injecting a physical blowing agent into the mixture to form a foaming mixture, transferring the foaming mixture to a secondary extruder, mixing and cooling the foaming mixture, and extruding the foaming mixture through an annular or flat die into a continuous foam sheet. Suitable nucleating agents include a mixture of citric acid and sodium bicarbonate, talc, and titanium dioxide. Suitable blowing agents include hydrocarbons such as butane and isopentane, chlorinated hydrocarbons, chlorofluorocarbons, nitrogen, carbon dioxide, and other inert gases.

Low density foam layers molded from foam beads can be made, for example, by making prefoamed beads by extruding a high melt strength polypropylene in the presence of a foaming agent such as, for example, pentane, hexane, dichlorotrifluoroethane and methylene chloride. One or more nucleating agents such as talc, colloidal silica, sodium bicarbonate or its blends with citric acid, and azodicarbonamide, can be added to the polymer before or during extrusion. The prefoamed beads are then thermoformed by sintering. A mold having the desired dimensions is filled with the prefoamed beads and the beads are heated by passing a hot pressurized gas such as superheated steam through the mold to obtain sintering and produce the finished article.

The composite materials can be used for making large structural parts, for example by pressure or melt thermoforming techniques. Examples of parts that can be made from these materials include co-extruded profiles; household appliance cabinets and door liners; hot tubs; and boat hulls and boat decks as well as boat engine covers, consoles, and hatches. The particular combination of materials used is determined by the properties desired in the thermoformed part.

The test methods used to evaluate the properties of molded specimens were:

| | |
|---|---|
| Room temperature (r.t.) Izod impact | ASTM D-256A |
| Flexural modulus | ASTM D-790-86 |
| Flexural strength | ASTM D-790-86 |
| Tensile strength | ASTM D-638-89 |
| Elongation at break | ASTM D-638-89 |
| Melt flow rate, 230° C., 2.16 kg | ASTM 1238 |
| Rockwell hardness | ASTM D-785, R scale |
| Plate impact | ASTM D-3763-93 |

All gloss readings were taken with a 60 degree gloss meter from a smooth (ungrained) sample. A gloss value of 50 or more was considered to be acceptable.

In this specification, all parts and percentages are by weight unless otherwise noted.

EXAMPLE 1

This example describes the preparation and physical testing of a graft copolymer useful for making layer (1) of the laminate of this invention. The graft copolymer was made from a propylene homopolymer as the backbone polymer, to which was grafted a methyl methacrylate/methyl acrylate copolymer.

In this and the following examples the propylene homopolymer used as the backbone polymer of the graft copolymer had the following properties: spherical form, melt flow-rate (MFR) of 9 g/10 min (ASTM D-1238, 230° C., 2.16 kg), a porosity of 0.45 $cm^3/g$, and a molecular weight $M_w$ of 170,000. The monomers were grafted onto the polypropylene backbone at a grafting temperature of 237° F. using the previously described peroxide-initiated graft polymerization process. Ninety-five parts by weight of total monomers were added per 100 parts of polypropylene, of which 4.4% was methyl acrylate. Lupersol PMS (50% t-butylperoxy-2-ethyl hexanoate in mineral spirits), commercially available from Elf Atochem, was used as the peroxide initiator. The monomers were fed at a combined rate of 1 pph/min for 95 minutes. A monomer to initiator molar ratio of 120 was used. The temperature was then raised to 284° F. for 120 min under a nitrogen purge.

The graft copolymer was then blended with a broad molecular weight distribution polypropylene (BMWD PP)

having a polydispersity index of 7.4, a MFR of 1 g/10 min, and xylene solubles at room temperature of 1.5%, commercially available from Montell USA Inc. The amount of BMWD PP used for each sample is given in Table 1. Enough BMWD PP was added to adjust the effective add level to the amount of monomer per hundred parts of polypropylene indicated in Table 1.

Engage 8150 ethylene/octene-1 copolymer having an octene-1 content of 25%, commercially available from Du Pont-Dow Elastomers, was added as an impact-modifier in the amounts shown in Table 1.

A UV stabilizer master batch was added to the formulation in an amount of 1.13% by weight. The master batch consisted of 0.25% Tinuvin 770 bis(2,2,6,6-tetramethyl-4-piperidinyl)sebacate stabilizer; 0.30% Tinuvin 328 2-(hydroxy-3,5-di-tert-amylphenyl)-2H-benzotriazole stabilizer; 0.25% Chimassorb 119 1,3,5-triazine-2,4,6-triamine, N,N'''-[1,2-ethanediylbis[N-[3-[4,6-bis-[butyl(1,2,2,6,6-pentamethyl-4-piperidinyl)amino]-1,3,5-triazin-2-yl]amino] propyl]-[N,'N''-dibutyl-N',N''-bis(1,2,2,6,6-pentamethyl-4-piperidinyl) stabilizer; 0.25% Irganox B-215, a mixture of 1 part Irganox 1010 tetrakis[methylene(3,5 -di-tert-butyl-4-hydroxyhydrocinnamate)]methane antioxidant and 2 parts Irgafos 168 tris(2,4-di-tert-butylphenyl) phosphite stabilizer, all commercially available from Ciba-Geigy Corporation, and 0.10% calcium stearate, based on the total weight of the composition.

3119 Ampacet 110499 (60% weatherable $TiO_2$ in an ethylene/methyl acrylate copolymer), commercially available from Ampacet Corporation, was also added in an amount of 1.67%.

The samples were compounded on a 40 mm co-rotating, intermeshing twin screw Werner & Phleiderer ZSK extruder at a barrel temperature of 220° C., a screw speed of 450 rpm, and a throughput rate of 210 lb/hr.

Compounded samples were dried at 80° C. for at least 4 hours prior to molding to remove moisture. Test specimens 8½" long, ½" wide in the test region, and ⅛" thick were used for all of the physical property measurements. Test bars were produced on a 5 oz Battenfeld injection molding machine at a barrel temperature of 490° F. and a mold temperature of 150° F.

The results of the property evaluations for each formulation are given in Table 1. In Table 1, Tot. E is total energy, and J is joules.

TABLE 1

| Sample Number | 1 | 2 | 3 | 4 | 5 |
|---|---|---|---|---|---|
| Graft copolymer (%) | 80.07 | 78.00 | 63.14 | 59.78 | 39.43 |
| Effective Polymerized Monomer Add Level (pph) | 70 | 70 | 50 | 50 | 30 |
| BMWD PP (%) | 14.67 | 14.28 | 29.14 | 27.58 | 43.02 |
| Rubber (%) | 2.46 | 4.92 | 4.92 | 9.84 | 14.75 |
| Stabilizer Master Batch (%) | 1.13 | 1.13 | 1.13 | 1.13 | 1.13 |
| Pigment (%) | 1.67 | 1.67 | 1.67 | 1.67 | 1.67 |
| MFR (230° C., 3.8 kg) g/10 min. | 2.7 | 2.4 | 2.5 | 2.7 | 2.9 |
| Flexural modulus, kpsi | 300 | 291 | 280 | 244 | 210 |
| Flexural strength, psi | 8459 | 8234 | 7961 | 6914 | 5951 |
| Tensile strength, psi | 5353 | 5158 | 5082 | 4558 | 4209 |
| Elongation to break (%) | 12 | 16 | 17 | 56 | 226 |
| 23° C. Izod impact (ft-lb/in) | 1.4 | 1.8 | 1.9 | 2.9 | 12.1 |
| Rockwell hardness (R) | 101 | 100 | 98 | 90 | 82 |
| Plate Impact, 23° C. (J) | 32.9 | 36.2 | 41 | 47.5 | 49.1 |
| 0° C. (J) | 2.5 | 16.8 | 18.3 | 38.3 | 50 |
| −10° C. (J) |  | 10.4 | 12.9 | 37.1 | 55.4 |
| −20° C. (J) |  |  |  |  | 54.8 |

EXAMPLE 2

This example describes the preparation and physical testing of a material suitable for use as layer (2) of the laminate of this invention. The material was a mixture of a high melt strength propylene polymer material (RMS PP) and one or more polyolefin materials.

HMS PP 1 was a propylene homopolymer having a MFR of 5–10 g/10 min. commercially available from Montell USA Inc. The high melt strength propylene polymer material was prepared by irradiating a propylene homopolymer having a nominal MFR of 1 g/10 min at a dose of -6 Mrad using the irradiation process described previously.

HMS PP 2 was a propylene homopolymer having a MFR of <5 g/10 min. commercially available from Montell USA Inc. The high melt strength propylene polymer material was prepared by irradiating a propylene homopolymer having a nominal MFR of 0.6 g/10 min at a dose of ~9 Mrad using the irradiation process described previously.

Polyolefin material 1 was a heterophasic polyolefin composition comprising a propylene homopolymer impact-modified with an ethylene/propylene copolymer rubber, the total polymerized ethylene content of the composition being 8.9%. The material is commercially available from Montell USA Inc.

Polyolefin material 2 was a heterophasic polyolefin composition comprising a propylene homopolymer impact-modified with an ethylene/propylene copolymer rubber, the total polymerized ethylene content of the composition being 8.8%. The material is commercially available from Montell USA Inc.

Polyolefin material 3 was a propylene polymer material commercially available from Montell USA Inc. comprising (a) 33% of a propylene-ethylene random copolymer having an ethylene content of 3.3% and an isotactic index, defined as the xylene insoluble fraction, of 94, (b) 6.5% of a semi-crystalline ethylene-propylene copolymer that is insoluble in xylene at room temperature, and (c) 60.5% of an ethylene-propylene copolymer that is soluble in xylene at room temperature.

A stabilizer package consisting of 0.15% calcium stearate and 0.3% Irganox B-225 antioxidant, based on the total weight of the sample, was also added. B-225 antioxidant is a blend of 1 part Irganox 1010 antioxidant and 1 part krgafos 168 stabilizer, commercially available from Ciba-Geigy Corporation.

The samples were compounded on a 40 mm co-rotating, intermeshing twin screw Werner & Phleiderer ZSK extruder at a barrel temperature of 250° C., a screw speed of 350 rpm, and a throughput rate of 150 lb/hr for Sample 1 and 220 lb/hr for Sample 2. Sample 3 was compounded on a 92 mm co-rotating, intermeshing twin screw extruder at a barrel temperature of 390° F., a screw speed of 225 rpm, and a throughput rate of 1800 lb/hr.

Test bars for physical property measurements were molded as described in Example 1.

The results of the property evaluations for each formulation are given in Table 2.

TABLE 2

| | Sample Number | | |
|---|---|---|---|
| | 1 | 2 | 3 |
| HMS PP 1 (%) | 19.91 | 19.91 | — |
| HMS PP 2 (%) | — | — | 19.92 |
| Polyolefin Material 1 (%) | 79.64 | — | — |
| Polyolefin Material 2 (%) | — | 59.73 | 69.72 |
| Polyolefin Material 3 (%) | — | 19.91 | 9.96 |

TABLE 2-continued

| | Sample Number | | |
|---|---|---|---|
| | 1 | 2 | 3 |
| Ca Stearate (%) | 0.15 | 0.15 | 0.1 |
| Antioxidant (%) | 0.3 | 0.3 | 0.3 |
| MFR @ 230° C., 2.16 kg (g/10 min) | 1.1 | 3.0 | 1.9 |
| Flexural Modulus, kpsi | 179 | 126 | 164 |
| Flexural Strength, psi | 5138 | 3633 | 4670 |
| Tensile Strength, psi | 4344 | 3323 | 3863 |
| Elongation to Break (%) | 230 | 680 | 394 |
| 23° C. Izod Impact (ft-lb/in) | 16.9 | 15.1 | 11.9 |
| Plate Impact, 23° C. (J) | 35.1 | 32.2 | 40.3 |
| 0° C. (J) | 11.2 | 38.9 | 44.1 |
| −10° C. (J) | — | 43 | 37.9 |
| −20° C. (J) | 3.2 | 36.9 | 20.2 |

EXAMPLE 3

Preparation of a co-extruded laminate was simulated in the laboratory using a Boy 203 injection molder. Disks 4" in diameter and 33 mils thick were molded from each graft copolymer formulation at a barrel temperature of 510° F. and a mold temperature of 175F (layer (1)). The disks were then inserted into a mold cavity that was ⅛" deep and layer (2) containing the high melt strength propylene polymer material was injected into the cavity at 520° F. to produce ⅛" thick laminates. The samples used for each layer are given in Table 3.

Rheometric impact measurements were made on the laminates as indicated in Table 3. Descriptions of the graft copolymer formulations in layer (1) are found in Example 1. Descriptions of the HMS PP formulations in layer (2) are found in Example 2. The same tests were conducted on comparative samples consisting of glass fiber-reinforced polyester (FRP), and ABS capped with ASA. The results are given in Table 3.

TABLE 3

| Graft Copolymer Sample No. | HMS PP Sample Number | R.T. Tot. E (J) | 0° C. Tot. E (J) | −20° C. Tot. E (J) |
|---|---|---|---|---|
| 1 | 1 | 29.7 | 18.7 | — |
| 2 | 1 | 29.8 | 24 | — |
| 3 | 1 | 33 | 26.8 | — |
| 1 | 2 | 31.2 | 33.4 | — |
| 2 | 2 | 31.6 | 38.6 | — |
| 3 | 2 | 32.5 | 37.1 | — |
| 4 | 2 | 22.8 | 25.9 | — |
| 5 | 2 | 26.3 | 29.9 | 23.8 |
| FRP | | 14.1 | 10.6 | — |
| ASA/ABS | | 18.6 | 20.7 | 8.3 |

EXAMPLE 4

This example describes the preparation of a co-extruded laminate in which layer (1) contained a methyl methacrylatelmethyl acrylate-grafted propylene homopolymer and layer (2) contained a midxture of polyolefin materials 2 and 3 and high melt strength propylene polymer material 2.

The graft copolymer was prepared as described in Example 1 and was then blended with the BMW PP described in Example 1. The amounts of graft copolymer and BMWD PP are given in Table 4. Enough BMWD PP was added to adjust the effective add level to the amount of monomer per hundred parts of polypropylene indicated in Table 4.

Engage 8150 ethylene/octene-1 copolymer, commercially available from Du Pont-Dow Elastomers, was added as an impact modifier in the amounts shown in Table 4. The UV stabilizer master batch used in Example 1 was added to Samples 1–5 in an amount of 1.12% by weight. A UV stabilizer master batch consisting of 19.05% Irganox LC20 FF, which is a mixture of 1 part Irganox 1010 antioxidant and 1 part Irgafos 12 stabilizer (2,2',2"-nitrilo triethyl-tris [3,3',5',5'-tetra-tert-butyl-1,1'-biphenyl-2,2'-diyl] phosphite), commercially available from Ciba Geigy Corporation; 9.52% Pationic 1240, modified calcium salt of lactic acid, commercially available from the Patco Polymer Additives Division of American Ingredients Company; 28.57% Tinuvin 328, commercially available from Ciba Geigy Corporation; 23.8% Tinuvin 770, commercially available from Ciba Geigy Corporation, and 23.8% Chimassorb 119, commercially available from Ciba Geigy Corporation, was added to Sample 6 in an amount of 1.03% by weight.

A pigment package consisting of 81.22% 3113 R960 white PW6 $TiO_2$ pigment, commercially available from E. I. Du Pont de Nemours & Company; 18.26% Advawax 280 N,N'-ethylenebis(stearamide) pigment dispersion aid, commercially available from Morton International; 0.017% 2607 2GLTE YEL.PY 109, commercially available from Ciba-Geigy Corporation, and 0.503% 3309 GOLD. 19P.BLK12, commercially available from Shepherd Chemical Company, was also added in an amount of 1.14%.

Samples 1–5 were compounded as described in Example 1. Sample 6 was compounded on a 40 mm co-rotating, intermeshing twin screw Werner & Phleiderer ZSK extruder with a flat profile at a barrel temperature of 220° C., a screw speed of 430 rpm, and a throughput rate of 225 lb/hr.

Compounded samples were dried at 80° C. for at least 4 hours prior to molding to remove moisture. Test bars for physical testing were produced as described in Example 1.

The results of the property evaluations are given in Table 2.

TABLE 4

| Sample Number | 1 | 2 | 3 | 4 | 5 | 6 |
|---|---|---|---|---|---|---|
| Graft Copolymer (%) | 79.47 | 77.41 | 62.66 | 59.34 | 39.14 | 77.33 |
| Effective polymerized monomer content (pph) | 70 | 70 | 50 | 50 | 30 | 70 |
| BMWD PP (%) | 14.56 | 14.18 | 28.93 | 27.37 | 42.7 | 14.3 |
| Rubber (%) | 2.44 | 4.88 | 4.88 | 9.76 | 14.64 | 4.92 |
| Stabilizer master batch (%) | 1.12 | 1.12 | 1.12 | 1.12 | 1.12 | 1.03 |
| Pigment package (%) | 2.41 | 2.41 | 2.41 | 2.41 | 2.41 | 2.41 |
| MFR @ 230° C., 3.8 kg (g/10 min) | 3 | 3.2 | 3 | 3.1 | 3.3 | 4.9 |
| Flexural modulus (kpsi) | 285 | 263 | 258 | 213 | 169 | 264 |
| Tensile strength (psi) | 5255 | 4893 | 5012 | 4241 | 3684 | 485 |
| Elongation to break (%) | | | | | | 36 |
| 23° C. Izod impact (ft-lb/in) | 1.4 | 1.8 | 1.7 | 2.9 | 16.5 | 1.4 |
| Flexural strength (psi) | 8335 | 7614 | 7591 | 6280 | 4994 | 7397 |
| Rockwell hardness (R) | 101 | 96 | 97 | 85 | 70 | |

Layer (2) consisted of a mixture of high melt strength propylene polymer material 2, polyolefin materials 2 and 3, calcium stearate and B-225 antioxidant, commercially available from Ciba-Geigy Corporation. The high melt strength propylene polymer material and the polyolefin materials are described in Example 2. The amounts of each component of the formulation are given in Table 5.

The samples were compounded as described in Example 2.

Test bars for physical property measurements were molded as described in Example 1.

The results of the property evaluations are given in Table 2, Sample 3.

Co-extruded laminates were produced from Sample 1 of the graft copolymer formulations and the high melt strength propylene polymer formulation described above. The co-extrusion was carried out using a primary extruder having a 6" single screw and a barrel temperature of 420° F. (high melt strength propylene polymer layer) and a co-extruder having a 4½" single screw and a barrel temperature of 465° F. (graft copolymer layer). The die was a coat hanger single manifold die with a die gap setting of 350 mils. The combined throughput rate was 1800 lb/hr. The results of the physical testing measurements on the co-extruded laminate are given in Table 5.

TABLE 5

| Laminate Top Layer Sample No. 1 | |
| --- | --- |
| Graft Copolymer (%) | 79.47 |
| Effective Polymerized Monomer Add Level (pph) | 70 |
| BMWD PP (%) | 14.56 |
| Rubber (%) | 2.44 |
| Stabilizer Master Batch (%) | 1.12 |
| Pigment (%) | 2.41 |
| Laminate Bottom Layer Sample No. 3 | |
| HMS PP 2 (%) | 19.92 |
| Polyolefin Material 2 (%) | 69.72 |
| Polyolefin Material 3 (%) | 9.96 |
| Ca Stearate (%) | 0.1 |
| Antioxidant (%) | 0.3 |
| Laminate Thickness (mils) | 233 |
| Laminate Flexural Modulus (kpsi) | 200 |
| Laminate Flexural Strength (psi) | 6182 |
| Gloss (60 deg) (%) | 86 |
| Rockwell Hardness (R) | |
| 23° C. Plate Impact (J) | 79 |
| 0° C. (J) | 91 |
| −10° C. (J) | 76 |
| −20° C. (J) | 23 |

EXAMPLE 5

This example describes the preparation of a co-extruded laminate in which layer (1) contained a methyl methacrylate/methyl acrylate-grafted propylene homopolymer and layer (2) contained a mixture of polyolefin materials 2 and 3 and high melt strength propylene polymer material 2.

The graft copolymer was prepared as described in Example 1 and was then blended with the BMWD PP described in Example 1. The amounts of graft copolymer and BMWD PP are given in Table 6. Enough BMWD PP was added to adjust the effective monomer add level to 70 parts per hundred parts of propylene homopolymer. The UV stabilizer master batch described in Example 1 was added to Samples 1 and 2, and the stabilizer master batch described in Example 4 was added to Sample 6 in the amounts shown in Table 6.

Engage 8150 ethylene/octene-1 copolymer, commercially available from Du Pont-2 Dow Elastomers, was added as an impact modifier in the amounts shown in Table 6. The pigment described in Example 4 was added in an amount of 2.41% by weight.

Samples 1 and 2 were compounded as described in Example 1. Sample 6 was compounded as described in Example 4.

Layer (2) consisted of a mixture of high melt strength propylene polymer material 2, polyolefin materials 2 and 3, calcium stearate, B-225 antioxidant, commercially available from Ciba-Geigy Corporation, and $TiO_2$ pigment. The high melt strength propylene polymer material and the polyolefin materials are described in Example 2. The amounts of each component of the formulation are given in Table 6.

The samples were compounded as described in Example 2 for Sample 3.

Co-extruded laminates were produced from Samples 1, 2, and 6 of the graft copolymer formulations and the high melt strength propylene polymer formulation described above. The co-extrusion was carried out using a primary extruder having a 6" single screw and a melt temperature of −390° F. (high melt strength polypropylene layer) and a co-extruder having a 4" single screw and a melt temperature of 430° F. (graft copolymer layer). Both extruders were double vented and had a melt pump. For samples 1 and 2 the die was a coat hanger single manifold die with a die gap setting of 350 mils and the combined throughput rate was 1800 lb/hr. For Sample 6, the die was a dual manifold die with a die gap setting of 375 mils and the combined throughput rate was 1000 lb/hr.

The results of the physical testing measurements on the co-extruded laminates are given in Table 6.

TABLE 6

| | Sample No. | | | |
| --- | --- | --- | --- | --- |
| | 1 | 1 | 2 | 6 |
| Laminate Top Layer | | | | |
| Graft Copolymer (%) | 79.47 | 79.47 | 77.41 | 77.33 |
| Effective Polymerized Monomer Add Level | 70 | 70 | 70 | 70 |
| BMWD PP (%) | 14.56 | 14.56 | 14.18 | 14.3 |
| Rubber | 2.44 | 2.44 | 4.88 | 4.92 |
| Stabilizer Master Batch (%) | 1.12 | 1.12 | 1.12 | 1.03 |
| Pigment (%) | 2.41 | 2.41 | 2.41 | 2.41 |
| Laminate Bottom Layer | | | | |
| HMS PP 2 (%) | 19.92 | 19.92 | 19.92 | 19.71 |
| Polyolefin Material 2 (%) | 69.72 | 69.72 | 69.72 | 69.03 |
| Polyolefin Material 3 (%) | 9.96 | 9.96 | 9.96 | 9.86 |
| Ca Stearate (%) | 0.1 | 0.1 | 0.1 | 0.1 |
| Ti $O_2$ (%) | — | — | — | 1 |
| Antioxidant (%) | 0.3 | 0.3 | 0.3 | 0.3 |
| Laminate Thickness (mils) | 150 | 200 | 300 | 275 |
| Flexural Modulus (kpsi) | 115 | 188 | 157 | 215 |
| Gloss (60 deg) (%) | 89.5 | 90.5 | 87.6 | 87 |
| Rockwell Hardness (R) | 87.3 | 91.5 | 1O1.5 | — |
| 23° C. Plate Impact (J) | 41 | 78 | 155 | 147 |
| 0° C. (J) | 50.8 | 78.4 | 164.3 | 178.8 |

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A co-extruded laminate comprising:
   (1) at least one layer of a graft copolymer comprising a backbone of a propylene polymer material, having graft polymerized thereto about 10 parts to about 120 parts per hundred parts of the propylene polymer material of polymerized monomers selected from the group consisting of:
   (a) at least one acrylic monomer,
   (b) at least one styrenic monomer, and
   (c) mixtures of (a) and (b), and (2) at least one layer of a mixture comprising about 5% to about 40% of a propylene polymer material having a branching index of less than 1 and strain hardening elongational viscosity, the remainder comprising a polyolefin material selected from the group consisting of:
  (a) a crystalline homopolymer of propylene having an isotactic index greater than 80;
  (b) a crystalline random copolymer of propylene and an olefin selected from the group consisting of ethylene and $C_4$–$C_{10}$ α-olefins, provided that when the olefin is ethylene, the maximum polymerized ethylene content is 10% by weight, and when the olefin is a $C_4$–$C_{10}$ α-olefin, the maximum content thereof is 20% by weight, the copolymer having an isotactic index greater than 85;
  (c) a crystalline random terpolymer of propylene and two olefins selected from the group consisting of ethylene and $C_4$–$C_8$ α-olefins, provided that the maximum polymerized $C_4$–$C_8$ ethylene content is 20% by weight, and when ethylene is one of the olefins, the maximum polymerized ethylene content is 5% by weight, the terpolymer having an isotactic index greater than 85;
  (d) an olefin polymer composition comprising:
    (i) about 10 parts to about 60 parts by weight, of a crystalline propylene homopolymer having an isotactic index greater than 80, or a crystalline copolymer selected from the group consisting of (a) propylene and ethylene, (b) propylene, ethylene and a $C_4$–$C_8$ α-olefin, and (c) propylene and a $C_4$–$C_8$ α-olefin, the copolymer having a propylene content of more than 85% by weight and an isotactic index greater than 85;
    (ii) about 5 parts to about 25 parts by weight of a copolymer of ethylene and propylene or a $C_4$–$C_8$ α-olefin that is insoluble in xylene at ambient temperature; and
    (iii) about 30 parts to about 70 parts by weight of an elastomeric copolymer selected from the group consisting of (a) ethylene and propylene, (b) ethylene, propylene and a $C_4$–$C_8$ α-olefin, and (c) ethylene and a $C_4$–$C_8$ α-olefin, the copolymer optionally containing about 0.5% to about 10% by weight of a diene, and containing less than 70& by weight of ethylene and being soluble in xylene at ambient temperature and having an intrinsic viscosity of about 1.5 to about 4.0 dl/g;
    the total of (ii) and (iii), based on the total olefin polymer composition, being from about 50% to about 90%, and the weight ratio of (ii)/(iii) being less than 0.4, wherein the composition is prepared by polymerization in at least two stages and has a flexural modulus of less than 150 MPa;
  (e) a thermoplastic olefin comprising:
    (i) about 10% to about 60% of a propylene homopolymer having an isotactic index greater than 80, or a crystalline copolymer selected from the group consisting of (a) ethylene and propylene, (b) ethylene, propylene and a $C_4$–$C_8$ α-olefin, and (c) ethylene and a $C_4$–$C_8$ α-olefin, the copolymer having a propylene content greater than 85% by weight and an isotactic index greater than 85;
    (ii) about 20% to about 60% of an amorphous copolymer selected from the group consisting of (a) ethylene and propylene, (b) ethylene, propylene and a $C_4$–$C_8$ α-olefin, and (c) ethylene and a $C_4$–$C_8$ α-olefin, the copolymer optionally containing about 0.5% to about 10% of a diene, and containing less than 70% ethylene and being soluble in xylene at ambient temperature; and
    (iii) about 3% to about 40% of a copolymer of ethylene and propylene or a $C_4$–$C_8$ α-olefin that is insoluble in xylene at ambient temperature; and
    wherein the composition has a flexural modulus of greater than 150 but less than 1200 MPa;
  (f) a heterophasic polyolefin composition comprising:
    (i) about 30% to about 98% of a polymeric material selected from the group consisting of a propylene homopolymer having an isotactic index greater than 90, and a crystalline copolymer having an isotactic index greater than 85 of propylene and at least one α-olefin of the formula $CH_2$=CHR, where R is H or a $C_2$–$C_6$ alkyl group, the α-olefin being less than 10% of the copolymer when R is H, and being less than 20% when R is a $C_4$–$C_6$ alkyl group or a combination thereof with R=H, and
    (ii) about 2% to about 70% of an elastomeric copolymer of propylene and an α-olefin of the formula $CH_2$=CHR, where R is H or a $C_2$–$C_8$ alkyl group, the α-olefin being about 45% to about 75% of the elastomeric copolymer, and about 10% to about 40% of the elastomeric copolymer being insoluble in xylene at ambient temperature, or an elastomeric copolymer of ethylene and a $C_4$–$C_8$ α-olefin having an α-olefin content of about 15% to about 60%,
  (g) mixtures of two or more of (2)(a) to (2)(f); and
  wherein about 5% to about 85% of the total thickness of the laminate comprises the graft copolymer layer (1).

2. The laminate of claim 1, wherein the polymerized monomers in layer (1) are a dmixture of methyl methacrylate and methyl acrylate.

3. The laminate of claim 1, wherein the polymerized monomers in layer (1) are a mixture of methyl methacrylate and styrene.

4. The laminate of claim 1, wherein the polymerized monomer in layer (1) is styrene.

5. The laminate of claim 1, wherein layer (2) includes high melt strength, and an impact-modified propylene homopolymer.

6. The laminate of claim 1, wherein layer (1) also comprises a propylene polymer material selected from the group consisting of:
  (a) a crystalline homopolymer of propylene having an isotactic index greater than 80;
  (b) a crystalline random copolymer of propylene and an olefin selected from the group consisting of ethylene and $C_4$–$C_{10}$ α-olefins, provided that when the olefin is ethylene, the maximum polymerized ethylene content is 10% by weight, and when the olefin is a $C_4$–$C_{10}$ α-olefin, the maximum polymerized content thereof is 20% by weight, the copolymer having an isotactic index greater than 85;
  (c) a crystalline random terpolymer of propylene and two olefins selected from the group consisting of ethylene and $C_4$–$C_8$ α-olefins, provided that the maximum polymerized $C_4$–$C_8$ α-olefin content is 20% by weight, and, when ethylene is one of the olefins, the maximum polymerized ethylene content is 5% by weight, the terpolymer having an isotactic index greater than 85;

(d) an olefin polymer composition comprising:
  (i) about 10 parts to about 60 parts by weight, of a crystalline propylene homopolymer having an isotactic index greater than 80, or a crystalline copolymer selected from the group consisting of (a) propylene and ethylene, (b) propylene, ethylene and a $C_4$–$C_8$ α-olefin, and (c) propylene and a $C_4$–$C_8$ α-olefin, the copolymer having a propylene content of more than 85% by weight and an isotactic index greater than 85;
  (ii) about 5 parts to about 25 parts by weight of a copolymer of ethylene and propylene or a $C_4$–$C_8$ α-olefin that is insoluble in xylene at ambient temperature; and
  (iii) about 30 parts to about 70 parts by weight of an elastomeric copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing about 0.5% to about 10% by weight of a diene, and containing less than 70% by weight of ethylene and being soluble in xylene at ambient temperature, and having an intrinsic viscosity of about 1.5 to about 4.0 dl/g;
  the total of (ii) and (iii), based on the total olefin polymer composition, being from about 50% to about 90%, and the weight ratio of (ii)/(iii) being less than 0.4, wherein the composition is prepared by polymerization in at least two stages and has a flexural modulus of less than 150 MPa;
(e) a thermoplastic olefin comprising:
  (i) about 10% to about 60% of a propylene homopolymer having an isotactic index greater than 80, or a crystalline copolymer selected from the group consisting of (a) ethylene and propylene, (b) ethylene, propylene, and a $C_4$–$C_8$ α-olefin, and (c) ethylene and a $C_{4-8}$ α-olefin, the copolymer having a propylene content greater than 85% and an isotactic index of greater than 85%;
  (ii) about 20% to about 60% of an amorphous copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing about 0.5% to about 10% of a diene, and containing less than 70% ethylene and being soluble in xylene at ambient temperature; and
  (iii) about 3% to about 40% of a copolymer of ethylene and propylene or a $C_4$–$C_8$ α-olefin that is insoluble in xylene at ambient temperature, wherein the composition has a flexural modulus of greater than 150 but less than 1200 MPa.

7. The laminate of claim 1, wherein layer (1) also comprises a rubber component selected from the group consisting of (a) an olefin copolymer rubber, (b) a monoalkenyl aromatic hydrocarbon-conjugated diene block copolymer, (c) a core-shell rubber, and (d) mixtures thereof.

8. The laminate of claim 6, wherein layer (1) also comprises a rubber component selected from the group consisting of (a) an olefin copolymer rubber, (b) a monoalkenyl aromatic hydrocarbon-conjugated diene block copolymer, (c) a core-shell rubber, and (d) mixtures thereof.

9. The laminate of claim 1, wherein the high melt strength propylene polymer material is a propylene homopolymer.

10. The laminate of claim 1 comprising the following layers: (i) a graft copolymer layer in which the polymerized monomers are selected from the group consisting of (1) methyl methacrylate and methyl acrylate, (II) methyl methacrylate and styrene, and (E) styrene, and (ii) a mixture of (a) about 5% to about 30% of a high melt strength propylene polymer material having strain hardening elongational viscosity, and (b) an impact-modified polypropylene.

11. The laminate of claim 1 comprising the following layers: (i) a graft copolymer layer in which the polymerized monomers are selected from the group consisting of (I) methyl methacrylate and methyl acrylate, (II) methyl methacrylate and styrene, and (III) styrene, (ii) a mixture comprising about 5% to about 40% of a propylene polymer material having a branching index of less than 1 and strain hardening elongational viscosity, the remainder comprising the polyolefin composition (2) (d), and (iii) a graft copolymer that is the same as layer (i).

12. The laminate of claim 1 comprising the following layers: (i) a graft copolymer layer in which the polymerized monomers are selected from the group consisting of (I) methyl methacrylate and methyl acrylate, (II) methyl methacrylate and styrene, and (III) styrene, (ii) a mixture comprising about 5% to about 40% of a propylene polymer material having a branching index of less than 1 and strain hardening elongational viscosity, the remainder comprising the polyolefin composition (2) (d), and (iii) an impact-modified polypropylene.

13. A co-injection molded article comprising:
(1) at least one layer of a graft copolymer comprising a backbone of a propylene polymer material, having graft polymerized thereto about 10 parts to about 120 parts per hundred parts of the propylene polymer material of polymerized monomers selected from the group consisting of:
  (a) at least one acrylic monomer,
  (b) at least one styrenic monomer, and
  (c) mixtures of (a) and (b), and
(2) at least one layer of a mixture comprising about 5% to about 40% of a propylene polymer material having a branching index of less than 1 and strain hardening elongational viscosity, the remainder comprising a polyolefin material selected from the group consisting of:
  (a) a crystalline homopolymer of propylene having an isotactic index greater than 80;
  (b) a crystalline random copolymer of propylene and an olefin selected from the group consisting of ethylene and $C_4$–$C_{10}$ α-olefins, provided that when the olefin is ethylene, the maximum polymerized ethylene content is 10% by weight, and when the olefin is a $C_4$–$C_{10}$ α-olefin, the maximum content thereof is 20% by weight, the copolymer having an isotactic index greater than 85;
  (c) a crystalline random terpolymer of propylene and two olefins selected from the group consisting of ethylene and $C_4$–$C_8$ α-olefins, provided that the maximum polymerized $C_4$–$C_8$ ethylene content is 20% by weight, and when ethylene is one of the olefins, the maximum polymerized ethylene content is 5% by weight, the terpolymer having an isotactic index greater than 85;
  (d) an olefin polymer composition comprising:
    (i) about 10 parts to about 60 parts by weight, of a crystalline propylene homopolymer having an isotactic index greater than 80, or a crystalline copolymer selected from the group consisting of (a) propylene and ethylene, (b) propylene, ethylene and a $C_4$–$C_8$ α-olefin, and (c) propylene and a $C_4$–$C_8$ α-olefin, the copolymer having a propylene content of more than 85% by weight and an isotactic index greater than 85;

(ii) about 5 parts to about 25 parts by weight of a copolymer of ethylene and propylene or a $C_4$–$C_8$ α-olefin that is insoluble in xylene at ambient temperature; and (iii) about 30 parts to about 70 parts by weight of an elastomeric copolymer selected from the group consisting of (a) ethylene and propylene, (b) ethylene, propylene and a $C_4$–$C_8$ α-olefin, and (c) ethylene and a $C_4$–$C_8$ α-olefin, the copolymer optionally containing about 0.5% to about 10% by weight of a diene, and containing less than 70& by weight of ethylene and being soluble in xylene at ambient temperature and having an intrinsic viscosity of about 1.5 to about 4.0 dl/g;

the total of (ii) and (iii), based on the total olefin polymer composition, being from about 50% to about 90%, and the weight ratio of (ii)/(iii) being less than 0.4, wherein the composition is prepared by polymerization in at least two stages and has a flexural modulus of less than 150 MPa;

(e) a thermoplastic olefin comprising:

(i) about 10% to about 60% of a propylene homopolymer having an isotactic index greater than 80, or a crystalline copolymer selected from the group consisting of (a) ethylene and propylene, (b) ethylene, propylene and a $C_4$–$C_8$ α-olefin, and (c) ethylene and a $C_4$–$C_8$ α-olefin, the copolymer having a propylene content greater than 85% by weight and an isotactic index greater than 85;

(ii) about 20% to about 60% of an amorphous copolymer selected from the group consisting of (a) ethylene and propylene, (b) ethylene, propylene and a $C_4$–$C_8$ α-olefin, and (c) ethylene and a $C_4$–$C_8$ α-olefin, the copolymer optionally containing about 0.5% to about 10% of a diene, and containing less than 70% ethylene and being soluble in xylene at ambient temperature; and (iii) about 3% to about 40% of a copolymer of ethylene and propylene or a $C_4$–$C_8$ α-olefin that is insoluble in xylene at ambient temperature; and wherein the composition has a flexural modulus of greater than 150 but less than 1200 MPa;

(f) a heterophasic polyolefin composition comprising:

(i) about 30% to about 98% of a polymeric material selected from the group consisting of a propylene homopolymer having an isotactic index greater than 90, and a crystalline copolymer having an isotactic index greater than 85 of propylene and at least one α-olefin of the formula $CH_2$=CHR, where R is H or a $C_2$–$C_6$ alkyl group, the α-olefin being less than 10% of the copolymer when R is H, and being less than 20% when R is a $C_4$–$C_6$ alkyl group or a combination thereof with R =H, and (ii) about 2% to about 70% of an elastomeric copolymer of propylene and an α-olefin of the formula $CH_2$=CHR, where R is H or a $C_2$–$C_8$ alkyl group, the α-olefin being about 45% to about 75% of the elastomeric copolymer, and about 10% to about 40% of the elastomeric copolymer being insoluble in xylene at ambient temperature, or an elastomeric copolymer of ethylene and a $C_4$–$C_8$ α-olefin having an α-olefin content of about 15% to about 60%, (g) mixtures of two or more of (2)(a) to (2)(f); and wherein about 5% to about 85% of the total thickness of the laminate comprises the graft copolymer layer (1).

14. A thernoformed article comprising the co-extruded laminate of claim 1.

15. A thermoformed article comprising the co-extruded laminate of claim 8.

16. A thermoformed article comprising the co-extruded laminate of claim 10.

17. A thermoformed article comprising the co-extruded laminate of claim 11.

18. A thermoformed article comprising the co-extruded laminate of claim 12.

19. A composite material comprising.

(A) at least one layer of a co-extruded laminate comprising:

(1) at least one layer of a graft copolymer comprising a backbone of a propylene polymer material, having graft polymerized thereto polymerized monomers selected from the group consisting of:

(a) at least one acrylic monomer, (b) at least one styrenic monomer, and (c) mixtures of (a) and (b), and (2) at least one layer of a polyolefin material selected from the group consisting of:

(a) a crystalline homopolymer of propylene having an isotactic index greater than 80;

(b) a crystalline random copolymer of propylene and an olefin selected from the group consisting of ethylene and $C_4$–$C_{10}$ α-olefins, provided that when the olefin is ethylene, the maximum polymerized ethylene content is 10% by weight, and when the olefin is a $C_4$–$C_{10}$ α-olefin, the maximum polymerized content thereof is 20% by weight, the copolymer having an isotactic index greater than 85;

(c) a crystalline random terpolymer of propylene and two olefins selected from the group consisting of ethylene and $C_4$–$C_8$ α-olefins provided that the maximum polymerized $C_4$–$C_8$ α-olefin content is 20% by weight, and, when ethylene is one of the olefins, the maximum polymerized ethylene content is 5% by weight, the terpolymer having an isotactic index greater than 85;

(d) an olefin polymer composition comprising:

(i) about 10 parts to about 60 parts by weight, of a crystalline propylene homopolymer having an isotactic index greater than 80, or a crystalline copolymer selected from the group consisting of (a) propylene and ethylene, (b) propylene, ethylene and a $C_4$–$C_8$ α-olefin, and (c) propylene and a $C_4$–$C_8$ α-olefin, the colpolymer having a propylene content of more than 85% by weight and an isotactic index greater than 85;

(ii) about 5 parts to about 25 parts by weight of a copolymer of ethylene and propylene or a $C_4$–$C_8$ α-olefin that is insoluble in xylene at ambient temperature; and (iii) about 30 parts to about 70 parts by weight of an elastomeric copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing about 0.5% to about 10% by weight of a diene, and containing less than 70% by weight of ethylene and being soluble in xylene at ambient temperature and having an intrinsic viscosity of about 1.5 to about 4.0 dl/g;

the total of (ii) and (iii), based on the total olefin polymer composition, being from about 50% to about 90%, and the weight ratio of (ii)/(iii) being less than 0.4, wherein the composition is prepared by polymerization in at least two stages and has a flexural modulus of less than 150 MPa;

(e) a thermoplastic olefin comprising:
 (i) about 10% to about 60% of a propylene homopolymer having an isotactic index greater than 80, or a crystalline copolymer selected from the group consisting of (a) ethylene and propylene, (b) ethylene, propylene and a $C_4$–$C_8$ α-olefin, and (c) ethylene and a $C_4$–$C_8$ α-olefin, the copolymer having a propylene content greater than 85% and an isotactic index of greater than 85%;
 (ii) about 20% to about 60% of an amorphous copolymer selected from the group consisting of (a) ethylene and propylene, (b) ethylene, propylene and a $C_4$–$C_8$ α-olefin, and (c) ethylene and a $C_4$–$C_8$ α-olefin, the copolymer optionally containing about 0.5% to about 10% of a diene, and containing less than 70% ethylene and being soluble in xylene at ambient temperature; and
 (iii) about 3% to about 40% of a copolymer of ethylene and propylene or a $C_4$–$C_8$ α-olefin that is insoluble in xylene at ambient temperature, wherein the composition has a flexural modulus of greater than 150 but less than 1200 MPa;

(f) a heterophasic polyolefin composition comprising:
 (i) about 30% to about 98% of a polymeric material selected from the group consisting of a propylene homopolymer having an isotactic index greater than 90, and a crystalline copolymer having an isotactic index greater than 85 of propylene and at least one α-olefin of the formula $CH_2$=$CHR$, where R is H or a $C_2$–$C_6$ alkyl group, the α-olefin being less than 10% of the copolymer when R is H, and being less than 20% when R is a $C_4$–$C_6$ alkyl group or a combination thereof with R=H, and
 (ii) about 2% to about 70% of an elastomeric copolymer of propylene and an α-olefin of the formula $CH_2$=$CHR$, where R is H or a $C_2$–$C_8$ alkyl group, the α-olefin being about 45% to about 75% of the elastomeric copolymer, and about 10% to about 40% of the elastomeric copolymer being insoluble in xylene at ambient temperature, or an elastomeric copolymer of ethylene and a $C_4$–$C_8$ α-olefin having an α-olefin content of about 15% to about 60%;
(g) mixtures of two or more of (2)(a) to(2)(f); and
(h) mixtures of one or more of (2)(a) to (2)(g) and about 5% to about 40% of a propylene polymer material having a branching index less than 1 and strain hardening elongational viscosity, and wherein about 5% to about 85% of the total thickness of the laminate comprises the graft copolymer layer (1), and (B) a polyolefin foam layer having a density of about 1 to about 15 lb/ft$^3$.

20. A composite material comprising (a) at least one layer of the laminate of claim 8, and (b) a polyolefin foam layer having a density of about 1 to about 15 lb/ft$^3$.

21. A composite material comprising (a) at least one layer of the laminate of claim 10, and (b) a polyolefin foam layer having a density of about 1 to about 15 lb/ft$^3$.

22. A composite material comprising (a) at least one layer of the laminate of claim 11, and (b) a polyolefin foam layer having a density of about 1 to about 15 lb/ft$^3$.

23. A composite material comprising (a) at least one layer of the laminate of claim 12, and (b) a polyolefin foam layer having a density of about 1 to about 15 lb/ft$^3$.

24. A composite material comprising (a) the thermoformed article of claim 14, and (b) a polyolefin foam layer having a density of about 1 to about 15 lb/ft$^3$.

25. A composite material comprising (a) the thermoformed article of claim 15 and (b) a polyolefin foam layer having a density of about 1 to about 15 lb/ft$^3$.

26. A composite material comprising (a) the thermoformed article of claim 16, and (b) a polyolefin foam layer having a density of about 1 to about 15 lb/ft$^3$.

27. A composite material comprising (a) the thermoformed article of claim 17, and (b) a polyolefin foam layer having a density of about 1 to about 15 lb/ft$^3$.

28. A composite material comprising (a) the thermoformed article of claim 18, and (b) a polyolefin foam layer having a density of about 1 to about 15 lb/ft$^3$.

29. The composite material of claim 19, wherein wherein layer (2) comprises a mixture of (i) one or more of the polyolefin materials selected from the group consisting of (2)(a) to 2(g) and (ii) about 5% to about 40% of a propylene polymer material having a branching index of less than 1 and strain hardening elongational viscosity.

* * * * *